US006757272B1

(12) United States Patent
Abeta et al.

(10) Patent No.: US 6,757,272 B1
(45) Date of Patent: Jun. 29, 2004

(54) CHANNEL ESTIMATION UNIT, AND CDMA RECEIVER AND CDMA TRANSCEIVER WITH CHANNEL ESTIMATION UNIT

(75) Inventors: Sadayuki Abeta, Kanagawa (JP); Mamoru Sawahashi, Kanagawa (JP); Fumiyuki Adachi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/375,906

(22) Filed: Aug. 17, 1999

Related U.S. Application Data

(63) Continuation of application No. PCT/JP98/05727, filed on Dec. 17, 1998.

(30) Foreign Application Priority Data

Dec. 18, 1997 (JP) .............................................. 9-349609

(51) Int. Cl.[7] .............................................. H04B 15/00
(52) U.S. Cl. ....................... 370/342; 370/335; 370/328; 375/260
(58) Field of Search ................................. 375/260, 264, 375/230; 370/342, 345, 350, 335, 328, 329

(56) References Cited

U.S. PATENT DOCUMENTS

| 5,809,083 | A | * | 9/1998 | Wright ........................ 375/285 |
| 6,175,588 | B1 | * | 1/2001 | Visotsky et al. ............ 375/148 |
| 6,192,040 | B1 | * | 2/2001 | Jalloul et al. ................ 370/335 |
| 6,404,826 | B1 | * | 6/2002 | Schmidl et al. ............. 375/340 |

FOREIGN PATENT DOCUMENTS

| EP | 0 721 264 | 7/1996 |
| JP | 08-205839 | 2/1998 |
| JP | 08-340919 | 7/1998 |
| JP | 08-346025 | 7/1998 |
| WO | WO 96/10879 | 11/1996 |

OTHER PUBLICATIONS

"Rayleigh Fading Compensation for QAM in Land Mobile Radio Communications", Seiichi Sampei and Terumi Sunaga, IEEE Trans. (1993).
"Rayleigh Fading Compensation Method for 16QAM MODEM in Digital Land Mobile Radio Systems" (1989).
"Channel Estimation Filter Using Time–Multiplexed Pilot Channel for Coherent RAKE combining in DS–CDMA Mobile Radio", Andoh et al., IEICE Trans. (1998).
"Performance of Pilot Symbols–Assisted Coherent RAKE Receiver Using Weighted Multi–Slot Averaging fo r DS–CDMA Mobile Radio", Technical Report of IEICE (1997).
"The Performance of Channel Estimation Method using Weighted Multi–Symbol Averaging (WMSA) with Pilot Channel in DS–CDMA", Technical Report of IEICE (1997).

* cited by examiner

*Primary Examiner*—Thanh Cong Le
*Assistant Examiner*—Alan Gantt
(74) *Attorney, Agent, or Firm*—Workman, Nydegger & Seeley

(57) ABSTRACT

There are provided a channel estimation unit for achieving highly accurate channel estimation, a CDMA receiver and a CDMA transceiver with the channel estimation unit. Channel estimates of data symbols are obtained from pilot symbols in a combined symbol sequence which has a plurality of slots and includes the data symbols and the pilot symbols. First, the pilot symbols in the combined symbol sequence are located. Second, pilot blocks are generated by extracting the pilot symbols from two or more slots in the combined symbol sequence. Third, channel estimates of the data symbols are obtained by calculating a weighted sum of averages of the pilot symbols in the individual pilot blocks. The weighted sum is carried out using appropriate weighting factors for individual data symbols in each slot. This enables highly accurate channel estimation.

16 Claims, 12 Drawing Sheets

CHANNEL ESTIMATION UNIT, AND CDMA RECEIVER AND CDMA TRANSCEIVER WITH CHANNEL ESTIMATION UNIT

This application is a continuation application under 35 U.S.C. 365(c) of PCT International Application Number PCT/JP98/05727 filed Dec. 17, 1998, which claims priority to Japanese patent application serial number 349,609/1997 filed Dec. 18, 1997.

TECHNICAL FIELD

The present invention relates to an apparatus that has a plurality of slots and makes channel estimation (propagation path estimation) of data symbols from pilot symbols in a combined symbol sequence including the data symbols and pilot symbols, and a CDMA (Code Division Multiple Access) receiver and CDMA transmitter with the apparatus.

BACKGROUND ART

In a mobile communications environment, amplitude and phase fluctuations in a traffic channel can occur because of Raleigh fading due to changes in the relative location between a mobile station and a base station. Thus, in a conventional phase modulation scheme that transmits data (information) by the phase of a carrier, it is common for a transmitting side to carry out differential encoding of transmitted data for impressing the data on relative phases of neighboring symbols, and for a receiving side to discriminate and decide the data by differential detection.

However, since the transmitted data is subjected to the differential encoding as mentioned above, a one-bit error in a radio section appears as a two-bit error in the differential detection, thereby increasing the receiving error rate by 3 dB in terms of the SNIR (Signal-to-Noise Interference power Ratio) as compared with coherent detection like binary phase-shift keyed modulation (BPSK modulation).

On the other hand, although absolute coherent detection, which discriminates and decides the phase of a received signal using the absolute phase of each data symbol, has a highly efficient receiving characteristic, it is difficult under the Raleigh fading environment to decide the absolute phase of the reception.

In regard to this matter, reference 1, Seiichi Sampei and Terumi Sunaga, "Raleigh Fading Compensation for QAM in Land Mobile Radio Communication", IEEE Trans. Vehicular Technol., VT-42, No. 2, May 1993 proposes a method of estimating and compensating for fading distortion using pilot symbols that are inserted in data symbols at fixed intervals, and have known phases. In the reference 1, a pilot symbol is inserted at every several data symbols so as to carry out the channel estimation based on the received phase of the pilot symbol. More specifically, using the pilot symbols before and after the data symbol section, the method measures the amplitude and phase of a received signal of each path of each user, and estimates and compensates for channel fluctuations in the data symbol section by interpolating the values measured.

On the other hand, reference 2, Hidehiro Ando et al., "Channel Estimation Filter Using Time-Multiplexed Pilot Channel for Coherent RAKE Combining in DS-CDMA Mobile Radio", IEICE Trans. Commun. Vol. 81-B, No. 7 July 1998 proposes a method of carrying out channel estimation with higher accuracy by performing the channel estimation using more pilot symbols.

FIG. 11 illustrates a channel estimation method disclosed in the reference 2. This method carries out transmission power control on a slot by slot basis to follow instantaneous Raleigh fluctuations. Accordingly, as shown in FIG. 11, the amplitude (power) of a combined symbol sequence consisting of the data symbols and pilot symbols varies slot by slot, and its phase also varies slightly due to the operation of an amplifier in transmission. Such transmission power control enables a reverse channel of the DS-CDMA (Direct Sequence CDMA) to maintain the SNIR against interference signals due to cross-correlation from other users.

The channel estimation of data symbols is performed using the pilot symbols inserted into the data symbols at fixed intervals. More specifically, it obtains its channel estimates $\xi$ by averaging (coherently adding) pilot symbols $\tilde{\xi}$ (estimated complex fading envelope) in multiple slots before and after the slot to which the data symbols to be estimated belong, and then by summing the averages $\tilde{\xi}$ weighted by weighting factors a. Highly accurate channel estimation is carried out in this manner.

With such channel estimation using many pilot symbols belonging to different slots, this method can achieve the channel estimation at higher accuracy. This is because although the power of the pilot symbols fluctuates in the multiple slots, and channel estimation error takes place due to the power fluctuations, an effect of reduction in thermal noise and interference signals obtained by using pilot symbols in many slots is greater than the channel estimation error.

However, it is difficult for the method of the reference 2 to achieve the channel estimation with further accuracy because it considers the channel fluctuations in the individual slots are small, and obtains the channel estimates $\xi$ using the same weighting factor a for all the data symbols in each slot.

For example, as shown in FIG. 11, this method uses, even for the (m−A)th data symbol or the (m+B)th data symbol in the nth slot, where A and B are natural numbers, the same weighting factors a(0), a(1) and the like to obtain their channel estimates $\xi$ (n).

However, with regard to the (m−A)th data symbol, it will be reasonable to assign a greatest weight to the pilot symbols in the nth slot because they are closest (in time) to the (m−A)th data symbol, and. Hence best reflect the channel state at the time the data symbol is transmitted.

In contrast with this, with regard to the (m+B)th data symbol, it will be reasonable to assign a greatest weight to the pilot symbols in the (n+1)th slot because they are closest (in time) to the (m+B)th data symbol, and hence best reflect the channel state at the time the data symbol is transmitted.

Thus, the channel estimates should be obtained by assigning proper weighting factors to individual data symbols even though they belong to the same slot.

FIG. 12 illustrates an example of received envelope fluctuations due to fading. Points 1205, 1210, 1215, 1220 and 1225 indicate in fast fading the values of a received envelope at fixed time intervals. Points 1255, 1260, 1265 and 1270 indicate in slow fading the values of a received envelope at the same fixed time intervals.

The received envelope fluctuations are greater in the fast fading than in the slow fading. Accordingly, it is important especially in the fast fading to carry out the highly accurate channel estimation by assigning proper weighting factors to individual data symbols even though they belong to the same slot.

DISCLOSURE OF THE INVENTION

The present invention is implemented to solve the foregoing problems. It is therefore an object of the present invention to achieve highly accurate channel estimation by obtaining highly accurate channel estimates by assigning appropriate weighting factors to individual data symbols in the same slot, and by calculating a sum of appropriately weighted pilot symbols in respective slots before and after the slot the data symbols belong to, when carrying out the channel estimation of the data symbols.

The highly accurate channel estimation and compensation for channel fluctuations in the data symbols based on the channel estimation make it possible for the absolute coherent detection to decide the absolute phase of each data symbol even in the Raleigh fading environment, which can reduce the SNIR for achieving desired receiving quality (receiving error rate). This can reduce the transmission power, and increase the capacity of a system in terms of the number of simultaneous subscribers.

In order to accomplish the object aforementioned, according to the invention as claimed in claim 1, a channel estimation unit for obtaining channel estimates of data symbols from pilot symbols in a combined symbol sequence which has a plurality of slots and includes the data symbols and the pilot symbols, comprises:

means for locating the pilot symbols in the combined symbol sequence;

means for generating pilot blocks by extracting the pilot symbols from two or more slots in the combined symbol sequence in accordance with a located result; and means for obtaining the channel estimates of the data symbols by calculating a weighted sum of averages of the pilot symbols in the individual pilot blocks, wherein a magnitude of weighting differs between at least two data symbols in each slot.

According to the invention as claimed in claim 2, a CDMA receiver which receives a combined symbol sequence that is spread, has a plurality of slots, and includes data symbols and pilot symbols, and which generates a data sequence, comprises:

means for receiving the spread combined symbol sequence;

means for generating a combined symbol sequence by despreading the spread combined symbol sequence;

means for locating the pilot symbols in the combined symbol sequence;

means for generating pilot blocks by extracting the pilot symbols from two or more slots in the combined symbol sequence in accordance with a located result;

means for obtaining channel estimates of the data symbols by calculating a weighted sum of averages of the pilot symbols in the individual pilot blocks;

means for obtaining a data symbol sequence by eliminating the pilot symbols from the combined symbol sequence in accordance with the located result;

means for compensating for channel fluctuations in the data symbol sequence by using the channel estimates of the data symbols; and means for generating the data sequence by demodulating the data symbol sequence compensated for, wherein a magnitude of weighting differs between at least two data symbols in each slot.

According to the invention as claimed in claim 3, a CDMA transceiver including a transmitting processor and a receiving processor, comprises:

means for generating a data symbol sequence by modulating a data sequence;

means for generating a combined symbol sequence by inserting pilot symbols into the data symbol sequence;

means for generating a spread combined symbol sequence by spreading the combined symbol sequence; and means for transmitting the spread combined symbol sequence, wherein the spread combined symbol sequence to be transmitted has a plurality of slots, and the receiving processor comprises:

means for receiving the spread combined symbol sequence;

means for generating the combined symbol sequence by despreading the spread combined symbol sequence;

means for locating the pilot symbols in the combined symbol sequence;

means for generating pilot blocks by extracting the pilot symbols from two or more slots in the combined symbol sequence in accordance with a located result;

means for obtaining channel estimates of the data symbols by calculating a weighted sum of averages of the pilot symbols in the individual pilot blocks;

means for obtaining a data symbol sequence by eliminating the pilot symbols from the combined symbol sequence in accordance with the located result;

means for compensating for channel fluctuations in the data symbol sequence by using the channel estimates of the data symbols; and means for generating the data sequence by modulating the data symbol sequence compensated for, wherein a magnitude of weighting differs between at least two data symbols in each slot.

According to the invention as claimed in claim 4, in the CDMA transceiver as claimed in claim 3, he transmitting processor further comprises means or inserting into the data symbol sequence a power control symbol sequence for controlling power of the data symbols and pilot symbols.

According to the invention as claimed in claim 5, in the CDMA transceiver as claimed in claim 4, the receiving processor further comprises means for measuring from the pilot symbols a signal-to-noise and interference power ratio, and for generating the power control symbol sequence from the signal-to-noise and interference power ratio.

According to the invention as claimed in claim 6, in the CDMA transceiver as claimed in any one of claims 3–5, the receiving processor further comprises means for extracting, from the data symbol sequence compensated for, the power control symbol sequence for controlling power of the data symbols and pilot symbols, and the means for transmitting the spread combined symbol sequence transmits the spread combined symbol sequence in accordance with he power control symbol sequence.

According to the invention as claimed in claim 7, in the equipment as claimed in any one of claims 1–6, the power of the data symbols and pilot symbols is controlled on a slot by slot basis.

According to the invention as claimed in claim 8, in the equipment as claimed in any one of claims 1–7, the number of data symbols included in each slot of the combined symbol sequence is the same, and the number of pilot symbols included in each slot of the combined symbol sequence is the same.

According to the invention as claimed in claim 9, in the equipment as claimed in any one of claims 1–8, the pilot blocks each consist of all the pilot symbols in each slot.

According to the invention as claimed in claim 10, in the equipment as claimed in any one of claims 1–9, when obtaining the channel estimates of the data symbols in an nth slot in the combined symbol sequence, where n is an integer, the pilot blocks are generated from (n−K+1) th slot to (n+K) th slot in the combined symbol sequence, where K is a natural number.

According to the invention as claimed in claim 11, in the equipment as claimed in any one of claims 1–10, the pilot blocks closer to the data symbol with which the channel estimate is to be obtained have a greater weight.

According to the invention as claimed in claim 12, a channel estimation method of obtaining channel estimates of data symbols from pilot symbols in a combined symbol sequence which has a plurality of slots and includes the data symbols and the pilot symbols, comprises the steps of:
   locating the pilot symbols in the combined symbol sequence;
   generating pilot blocks by extracting the pilot symbols from two or more slots in the combined symbol sequence in accordance with a located result; and
   obtaining the channel estimates of the data symbols by calculating a weighted sum of averages of the pilot symbols in the individual pilot blocks, wherein a magnitude of weighting differs between at least two data symbols in each slot.

According to the invention as claimed in claim 13, a CDMA receiving method of generating a data sequence by receiving a combined symbol sequence that has a plurality of slots, includes data symbols and pilot symbols, and is spread, comprises the steps of:
   receiving the spread combined symbol sequence;
   generating the combined symbol sequence by despreading the spread combined symbol sequence;
   locating the pilot symbols in the combined symbol sequence;
   generating pilot blocks by extracting the pilot symbols from two or more slots in the combined symbol sequence in accordance with a located result;
   obtaining channel estimates of the data symbols by calculating a weighted sum of averages of the pilot symbols in the individual pilot blocks;
   obtaining a data symbol sequence by eliminating the pilot symbols from the combined symbol sequence in accordance with the located result;
   compensating for channel fluctuations in the data symbol sequence by using the channel estimates of the data symbols; and
   generating the data sequence by demodulating the data symbol sequence compensated for,
   wherein a magnitude of weighting differs between at least two data symbols in each slot.

According to the invention as claimed in claim 14, a CDMA transmitting and receiving method comprises the steps of:
   on a transmitting side,
      generating a data symbol sequence by modulating a data sequence;
      generating a combined symbol sequence by inserting pilot symbols into the data symbol sequence;
      generating a spread combined symbol sequence by spreading the combined symbol sequence; and
      transmitting the spread combined symbol sequence,
      wherein the spread combined symbol sequence to be transmitted has a plurality of slots, and
   on a receiving side,
      receiving the spread combined symbol sequence;
      generating the combined symbol sequence by despreading the spread combined symbol sequence;
      locating the pilot symbols in the combined symbol sequence;
      generating pilot blocks by extracting the pilot symbols from two or more slots in the combined symbol sequence in accordance with a located result;
      obtaining channel estimates of the data symbols by calculating a weighted sum of averages of the pilot symbols in the individual pilot blocks;
      obtaining a data symbol sequence by eliminating the pilot symbols from the combined symbol sequence in accordance with the located result; compensating for channel fluctuations in the data symbol sequence by using the channel estimates of the data symbols; and
      generating the data sequence by demodulating the data symbol sequence compensated for,
      wherein a magnitude of weighting differs between at least two data symbols in each slot.

BEST MODE FOR CARRYING OUT THE INVENTION

Best modes for implementing the present invention will now be described in detail with reference to the accompanying drawings.

First Embodiment

Figure 1:
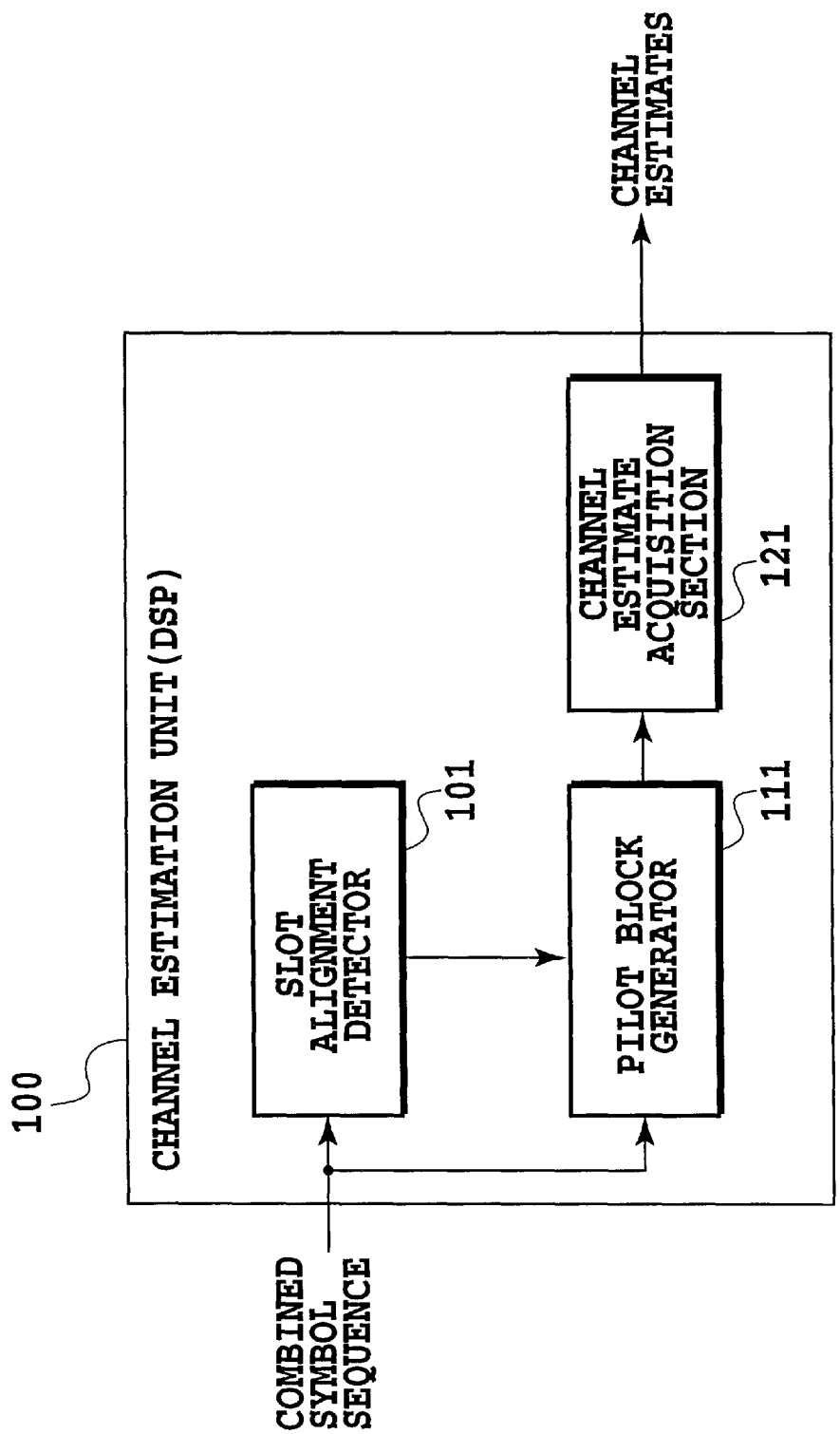
FIG. 1 is a block diagram showing a configuration of a channel estimation unit as a first embodiment in accordance with the present invention.

FIG. 1 is a block diagram showing a configuration of a channel estimation unit as a first embodiment in accordance with the present invention. A channel estimation unit 100 of the present embodiment obtains channel estimates of data symbols from pilot symbols in a combined symbol sequence that has a plurality of slots and includes the data symbols and pilot symbols.

The channel estimation unit 100 comprises a slot alignment detector 101, a pilot block generator 111 and a channel estimate acquisition section 121, Although the channel estimation unit 100 is implemented in the form of software using a DSP (Digital Signal Processor) (together with a memory that stores programs) in the present embodiment, it can be implemented in the form of hardware, in which case, components such as delay circuits are used as needed.

Figure 2:
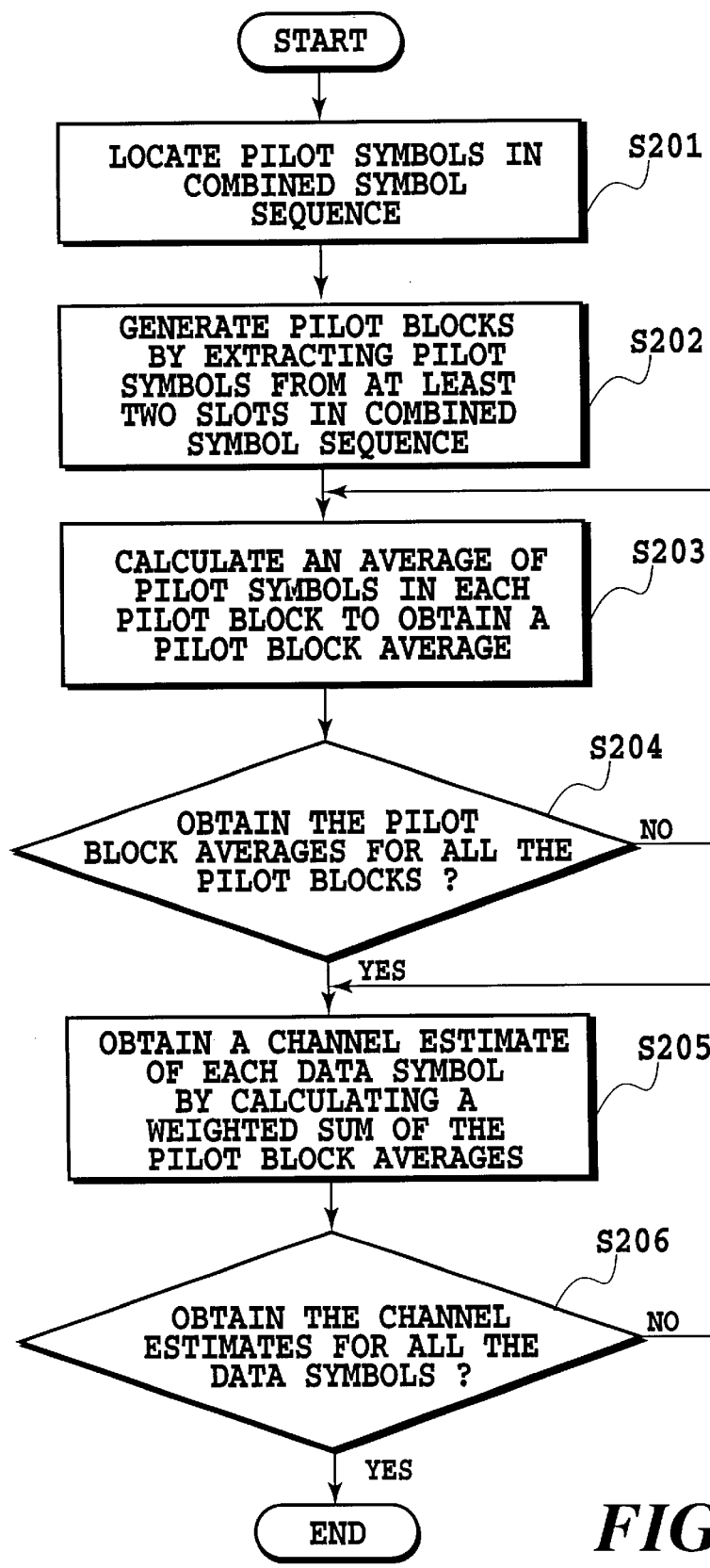
FIG. 2 is a flowchart illustrating a channel estimation processing by the channel estimation unit of the first embodiment in accordance with the present invention.
Figure 3:
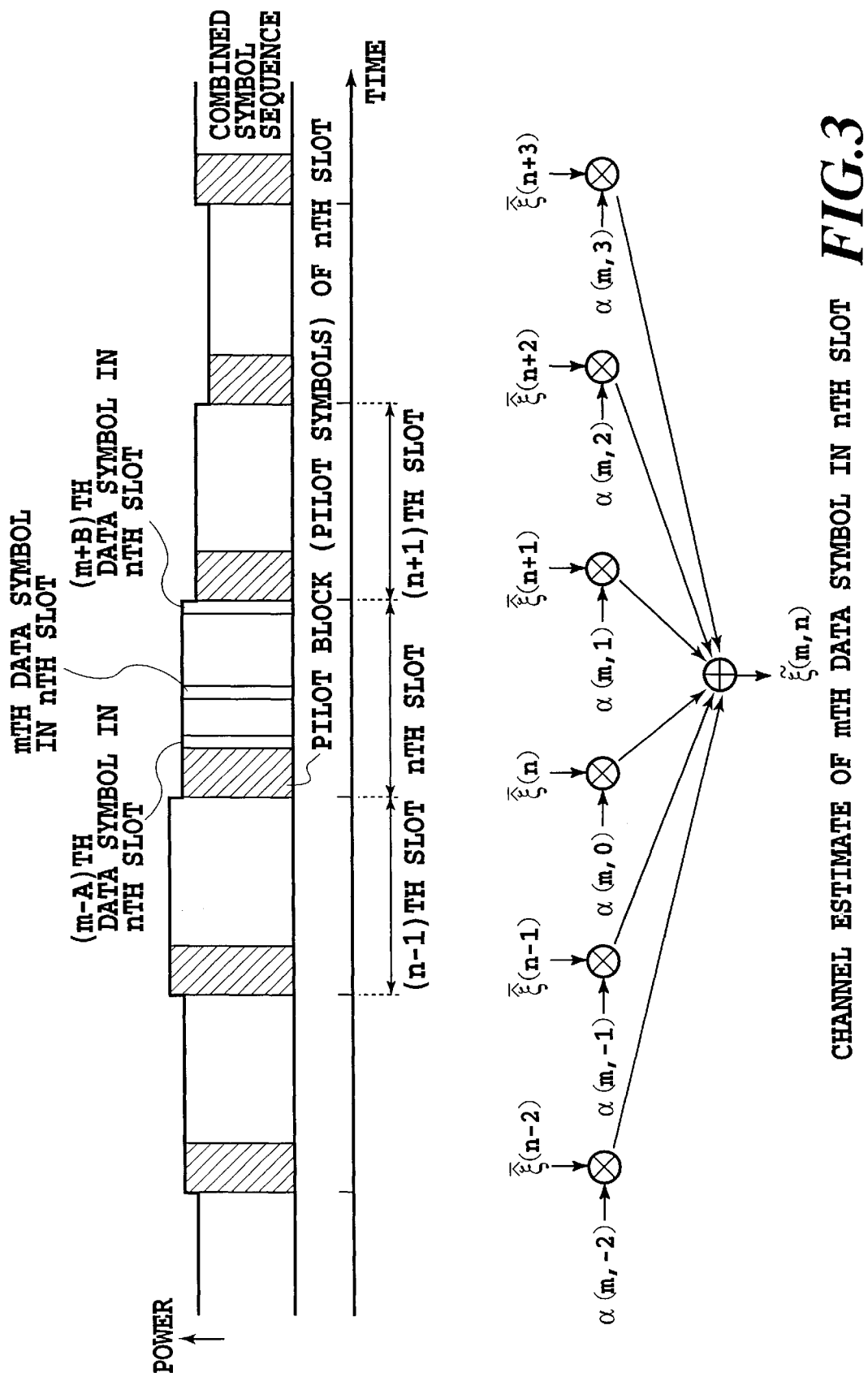
FIG. 3 is a diagram illustrating, taking an example of the channel estimation, the principle of operation of the channel estimation by the channel estimation unit of the first embodiment in accordance with the present invention.

FIG. 2 is a flowchart illustrating a channel estimation processing by the channel estimation unit of the present embodiment, and FIG. 3 is a diagram illustrating, taking an example that obtains the channel estimate of an mth data symbol in an nth slot (m and n are integers), the operation principle of the channel estimation unit of the present embodiment.

In the example of FIG. 3, the combined symbol sequence undergoes the transmission power control on a slot by slot basis. Although each slot of the combined symbol sequence in FIG. 3 consists of pilot symbols of a fixed length, followed by data symbols of a fixed length, each slot may consist of a single pilot symbol and a single data symbol, or a variable length pilot and data symbols. Alternatively, slots are allowable that consist of only data symbols or pilot symbols. Furthermore, the arrangement of the data symbols and pilot symbols can be determined freely.

First, at step S201 in FIG. 2, the slot alignment detector 101 locates the pilot symbols in the combined symbol sequence.

At step S202, the pilot block generator 111 extracts the pilot symbols from two or more slots of the combined symbol sequence in accordance with the locating result, and generates a plurality of pilot blocks. In the example of FIG. 3, it extracts pilot symbols from (n−K+1) th to (n+K) th slot of the combined symbol sequence, where K is a natural number which is three in FIG. 3, thereby generating the pilot blocks. A pilot block is defined as a set of pilot symbols.

Although the pilot blocks each consist of all the pilot symbols in a slot, they can be formed using part of the pilot symbols in the slot. Besides, a pilot block can consist of a single pilot symbol. In addition, the number of the pilot symbols in the individual pilot blocks can be varied from slot to slot.

To obtain the channel estimate of the data symbols in the nth slot, it is not necessary to generate nearly the same number of pilot blocks before and after the nth slot as in the example of FIG. 3. Thus, considering the delay of the channel estimation, the pilot blocks can be generated only from the slots with the number smaller than (previous to) the nth slot.

At steps S203–S206, the channel estimate acquisition section 121 obtains the channel estimates of the data symbols. First, at step S203, the channel estimate acquisition section 121 calculates an average of the pilot symbols $\hat{\xi}$ (estimated complex fading envelope) in each pilot block to obtain the pilot block average $\tilde{\xi}$ which is carried out for all the pilot blocks (step S204). When each pilot block consists of only one pilot symbol, the pilot symbol $\hat{\xi}$ itself becomes the pilot block average $\tilde{\xi}$. In the example of FIG. 3, the pilot block averages $\tilde{\xi}$ (n+i) are each obtained for the pilot blocks in the (n+i)th slot (i=−K+1 to K, where K=3).

At step S205, the channel estimates $\tilde{\xi}$ of the data symbol is obtained by calculating the weighted sum of the pilot block averages $\tilde{\xi}$ which are weighted by the weighted factors a. In the example of FIG. 3, the channel estimate $\tilde{\xi}$ (m,n) of the mth data symbol in the nth slot is obtained by placing the weights of the (n+i)th pilot block at a(m,i). The channel estimate $\tilde{\xi}$ (m,n) is given by the following equation (1).

$$\tilde{\xi}(m, n) = \sum_{i=-K+1}^{K} a(m, i) \cdot \tilde{\xi}(n + i) \tag{1}$$

It is preferable to increase the weights a(m,i) of the pilot blocks that are closer (in time) to the data symbol (mth data symbol in the nth slot) whose channel estimate is to be obtained. This is because such pilot blocks can be considered to represent the state of the propagation path during the transmission of that data symbol more correctly because the propagation path fluctuates at every moment.

For example, with regard to the (m−A)th data symbol (A is a natural number) in the nth slot in FIG. 3, it is preferable to maximize the weight of the pilot block in the nth slot. In contrast, with regard to the (m+B)th data symbol (B is a natural number) in the nth slot, it is preferable to maximize the weight of the pilot block in the (n+1)th slot.

The channel estimate acquisition section 120 iterates the foregoing step S205 for all the data symbols with which the channel estimates must be obtained (step S206).

Thus, highly accurate channel estimates can be obtained.

Second Embodiment

Figure 4:
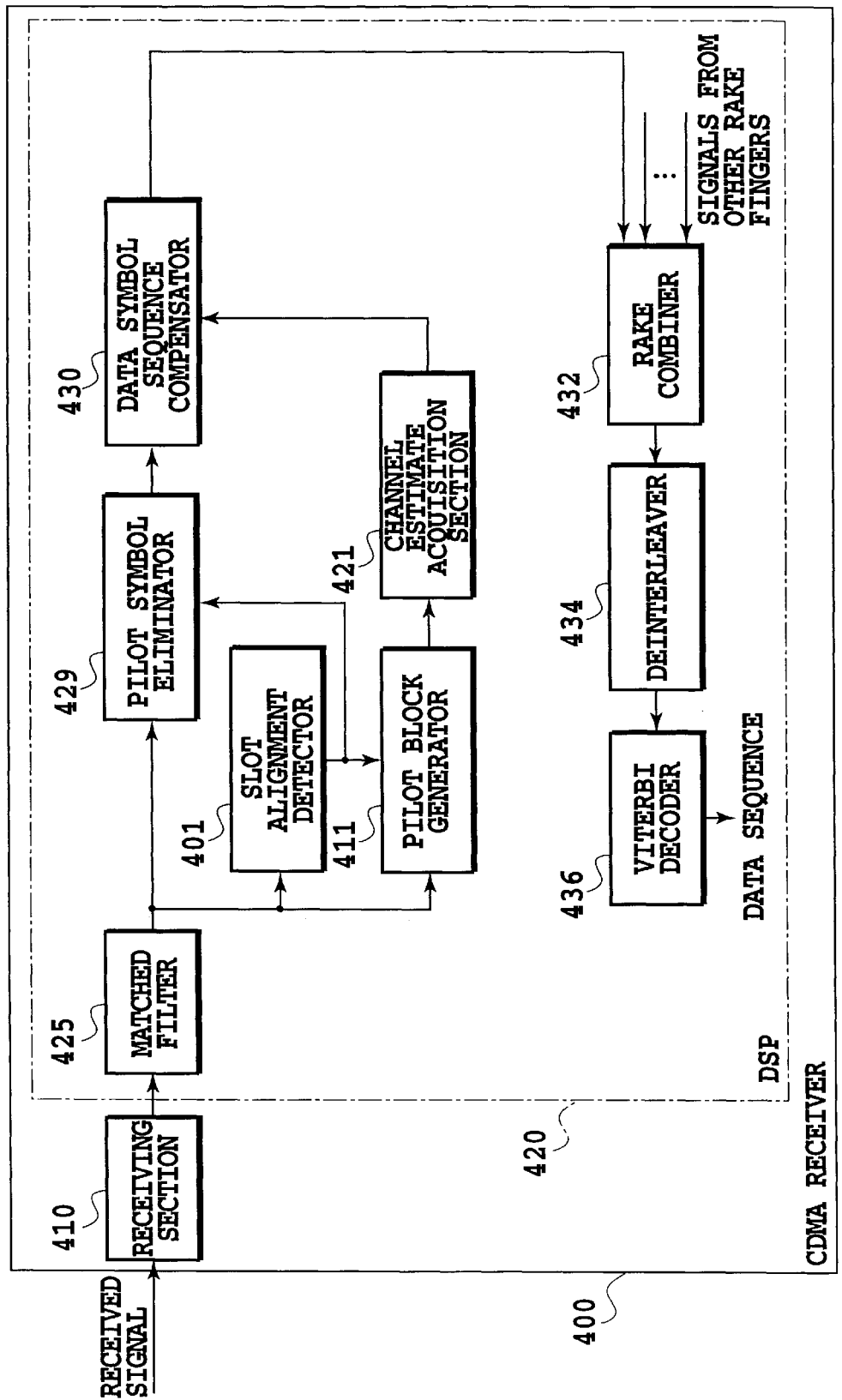
FIG. 4 is a block diagram showing a configuration of a CDMA receiver as a second embodiment in accordance with the present invention.

FIG. 4 is a block diagram showing a configuration of a CDMA receiver as a second embodiment in accordance with the present invention. A CDMA receiver 400 of the present embodiment receives a spread combined symbol sequence which has a plurality of slots including data symbols and pilot symbols, and generates the data sequence.

The CDMA receiver 400 comprises a receiving section 410, a matched filter 425, a slot alignment detector 401, a pilot block generator 411, a channel estimate acquisition section 421, a pilot symbol eliminator 429, a data symbol sequence compensator 430, a RAKE combiner 432, a deinterleaver 434 and a Viterbi decoder 436, Although these components such as the matched filter 425, slot alignment detector 401 and so forth are implemented in the form of software using a DSP (and a memory that stores programs) 420 as shown in FIG. 4 in the present embodiment, they can be implemented with hardware. The structure and functions of the slot alignment detector 401, pilot block generator 411 and channel estimate acquisition section 421 are the same as those of their counterparts in the channel estimation unit 100 of the first embodiment in accordance with the present invention.

Figure 5:
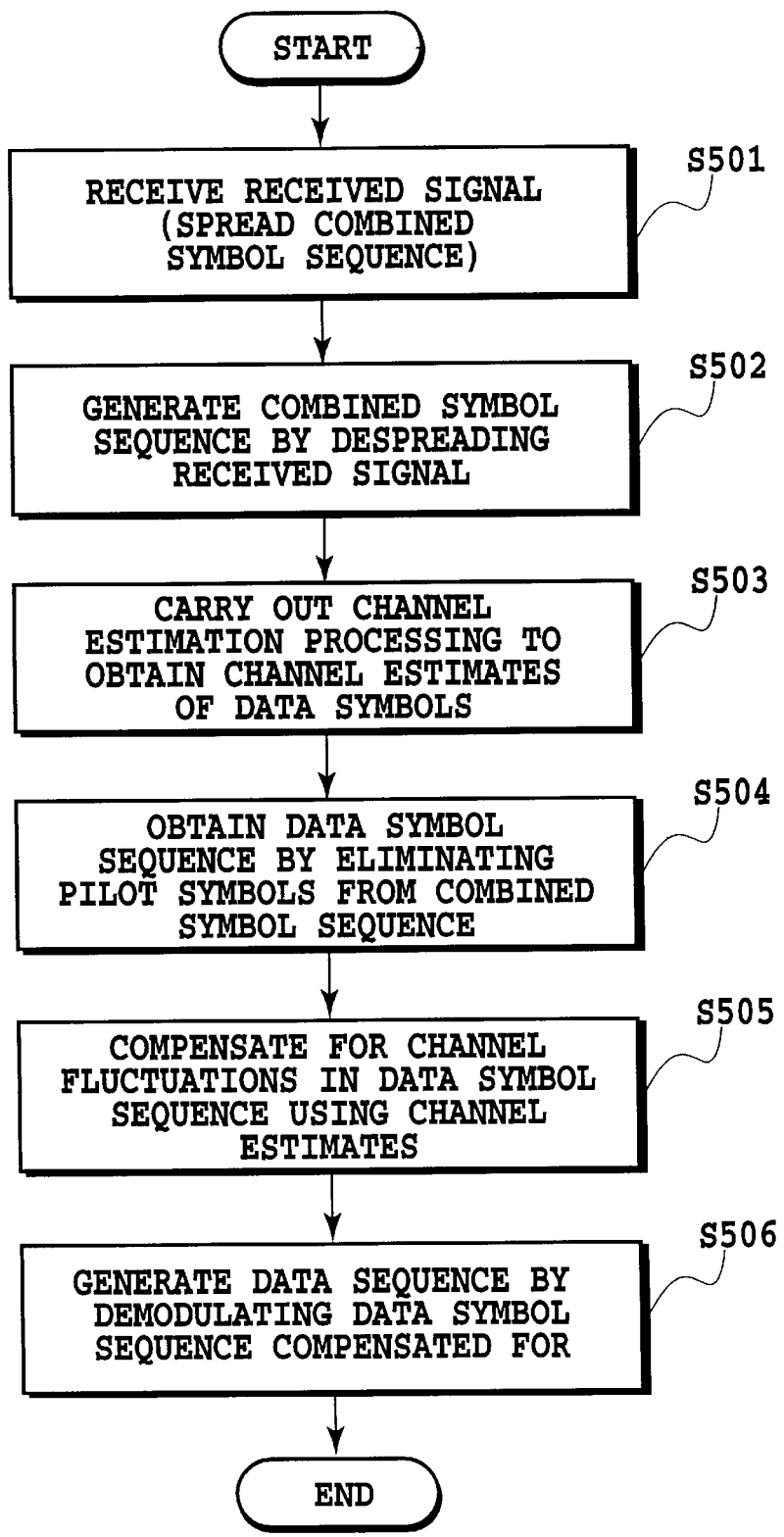
FIG. 5 is a flowchart illustrating a receiving processing by the CDMA receiver of the second embodiment in accordance with the present invention.

FIG. 5 is a flowchart illustrating a receiving processing by the CDMA receiver of the present embodiment in accordance with the present invention. First, at step S501, the receiving section 410 receives the received signal, that is, the spread combined symbol sequence.

At step S502, the matched filter 425 despreads the received signal to generate the combined symbol sequence.

At step S503, the slot alignment detector 401, pilot block generator 411 and channel estimate acquisition section 421 carry out a channel estimation processing to obtain the channel estimates of the data symbols. The channel estimation processing is the same as that of the channel estimation unit 100 (FIG. 2) of the first embodiment in accordance with the present invention.

At step S504, the pilot symbol eliminator 429 obtains a data symbol sequence by removing the pilot symbols from the combined symbol sequence on the basis of the detection result by the slot alignment detector 401, At step S505, the data symbol sequence compensator 430 compensates for the channel fluctuations in the data symbol sequence using the channel estimates $\xi$ obtained at step S503, More specifically, it compensates for the channel fluctuations in the data symbols by multiplying the data symbol sequence by the complex conjugates of the channel estimates $\xi$.

At step S506, the RAKE combiner 432, deinterleaver 434 and Viterbi decoder 436 generate the data sequence by demodulating the compensated data symbol sequence. The RAKE combiner 432 carries symbol sequence fed from individual RAKE fingers.

Thus, the receiving processing can achieve highly accurate channel estimation, and the compensation for the channel fluctuations in the data symbol sequence.

Third Embodiment

Figure 6:
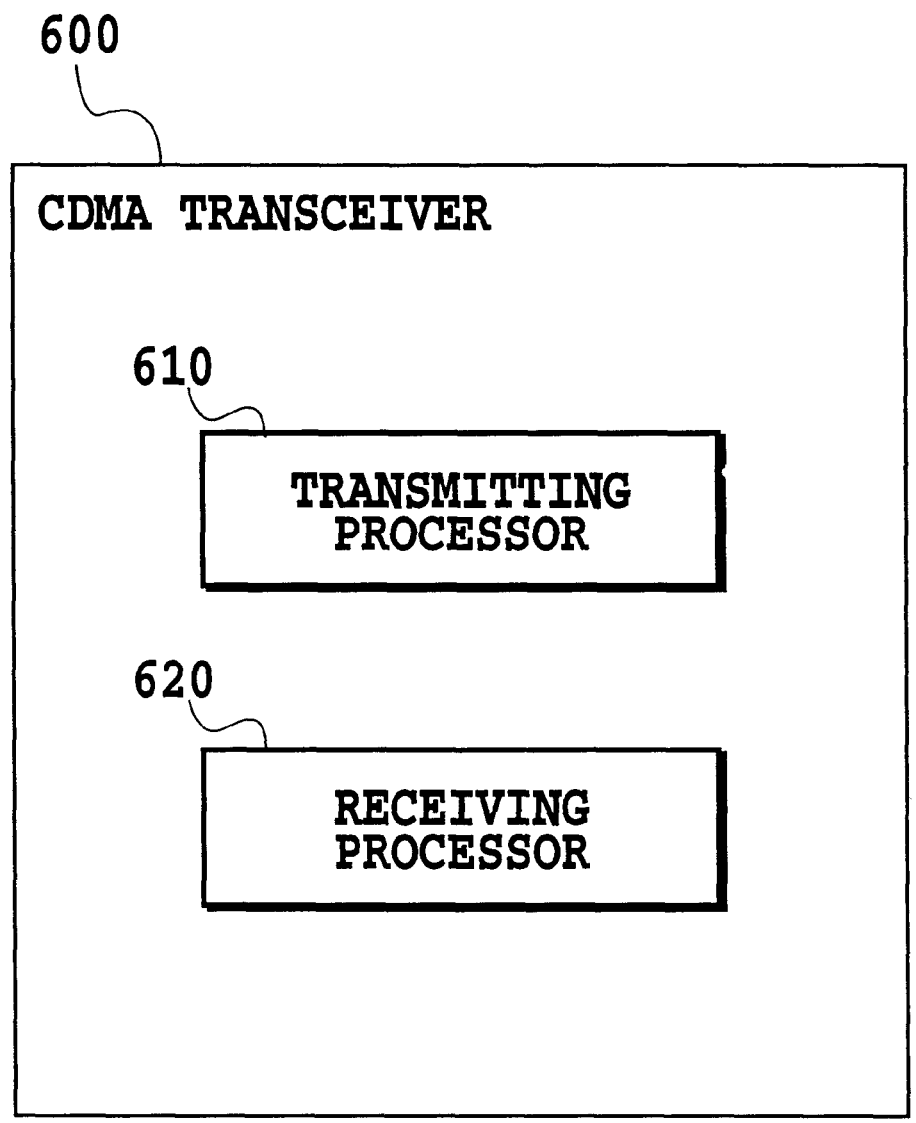
FIG. 6 is a block diagram showing a configuration of a CDMA transceiver as a third embodiment in accordance with the present invention.

FIG. 6 is a block diagram showing a configuration of a CDMA transceiver as a third embodiment in accordance with the present invention. A CDMA transceiver 600 of the present embodiment comprises a transmitting processor 610 and a receiving processor 620, In the present embodiment, this station (the present CDMA transceiver) exchanges power control symbols with a party station. The power control symbols are symbols (a command) for controlling power of the data symbols and pilot symbols.

Figure 7:
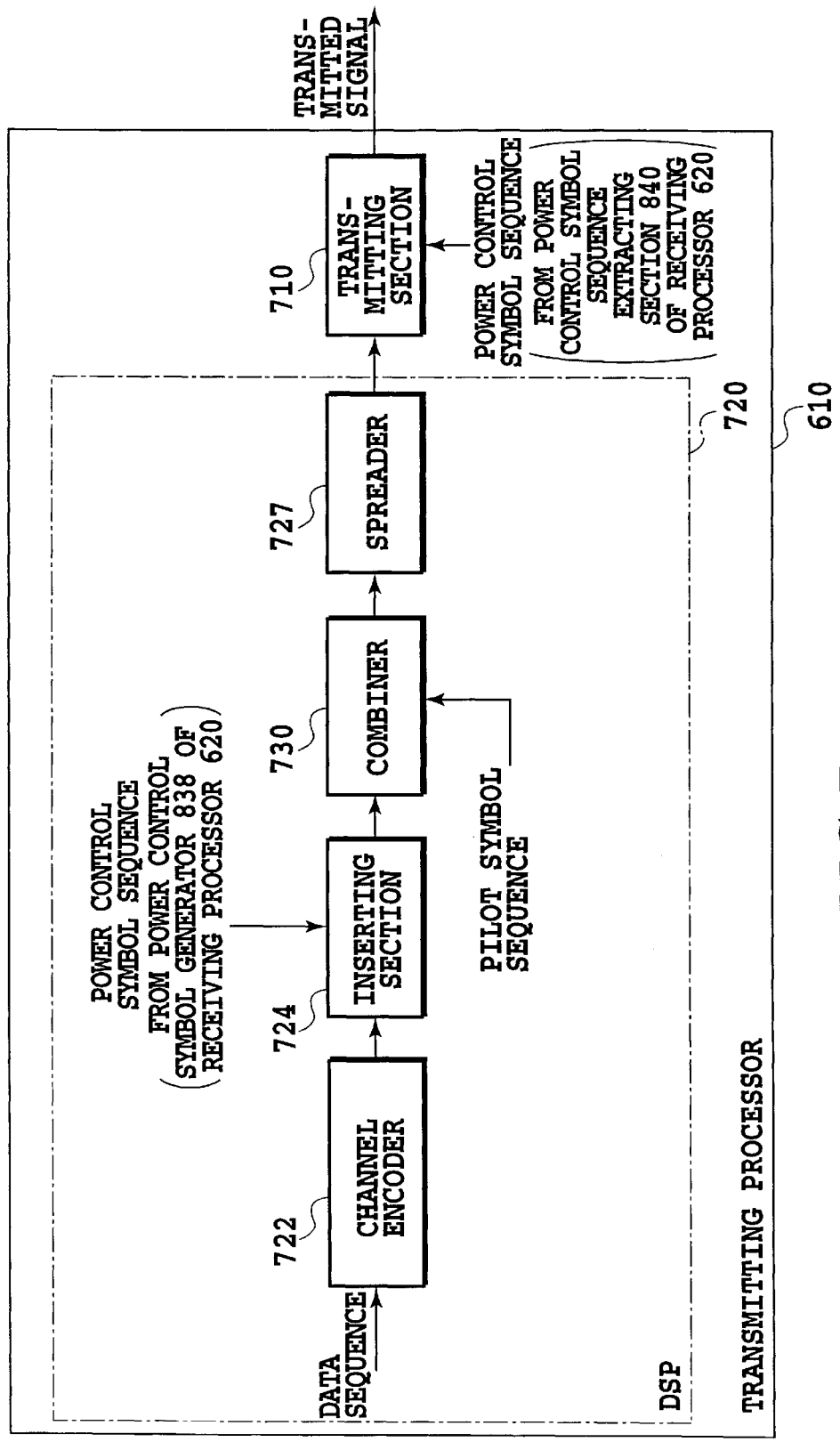
FIG. 7 is a block diagram showing a configuration of a transmitting processor of the CDMA transceiver of the third embodiment in accordance with the present invention.
Figure 8:
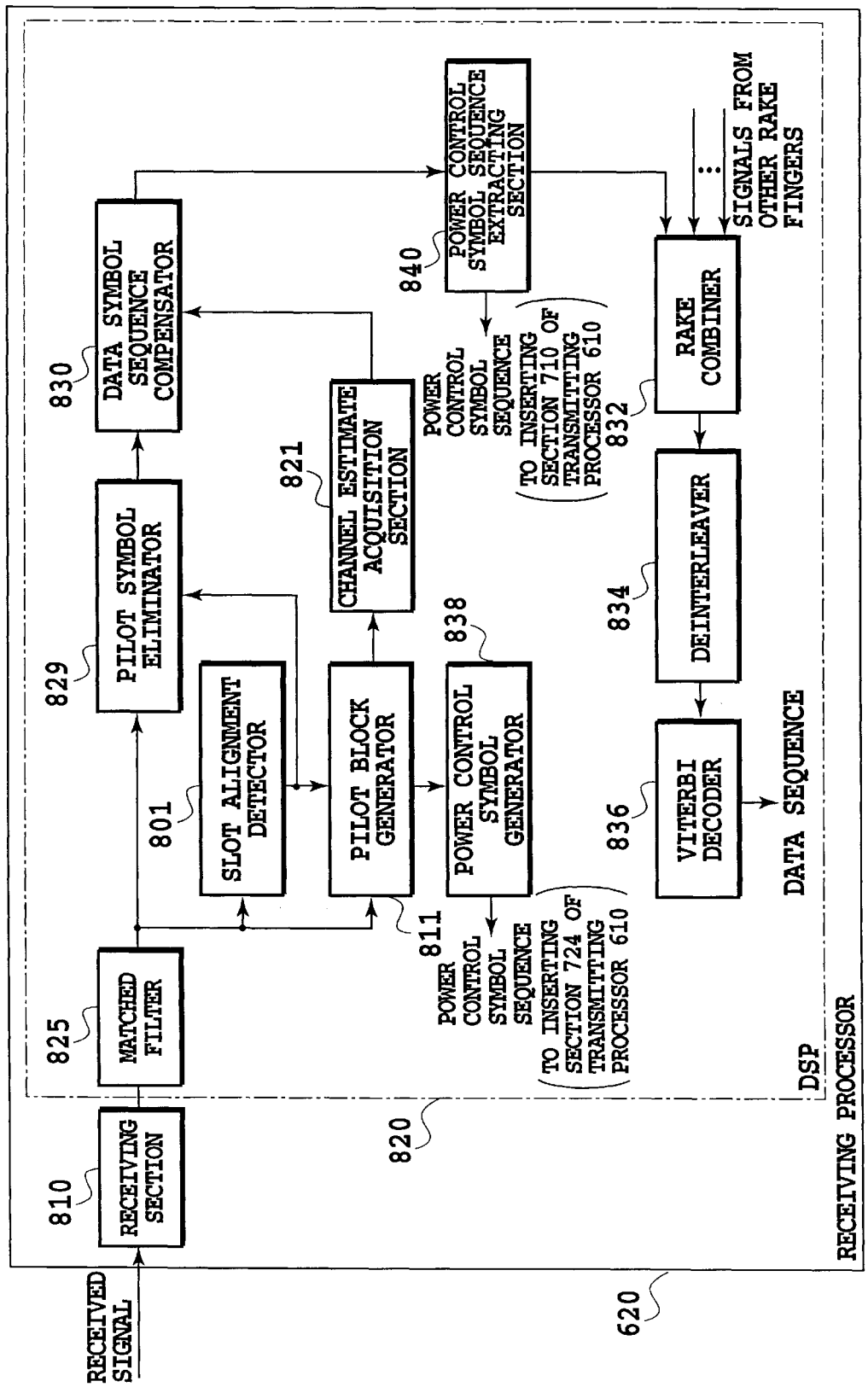
FIG. 8 is a block diagram showing a configuration of a receiving processor of the CDMA transceiver of the third embodiment in accordance with the present invention.

FIG. 7 shows a configuration of the transmitting processor 610, and FIG. 8 shows a configuration of the receiving processor.

As shown in FIG. 7, the transmitting processor 610 comprises a transmitting section 710, a channel encoder 722, an inserting section 724, a combiner 730 and a spreader 727, Although these components such as the channel encoder 722, inserting section 724 and so forth are implemented in the form of software using a DSP (and a memory that stores programs) 720 in the present embodiment, they can be implemented with hardware.

Figure 9:
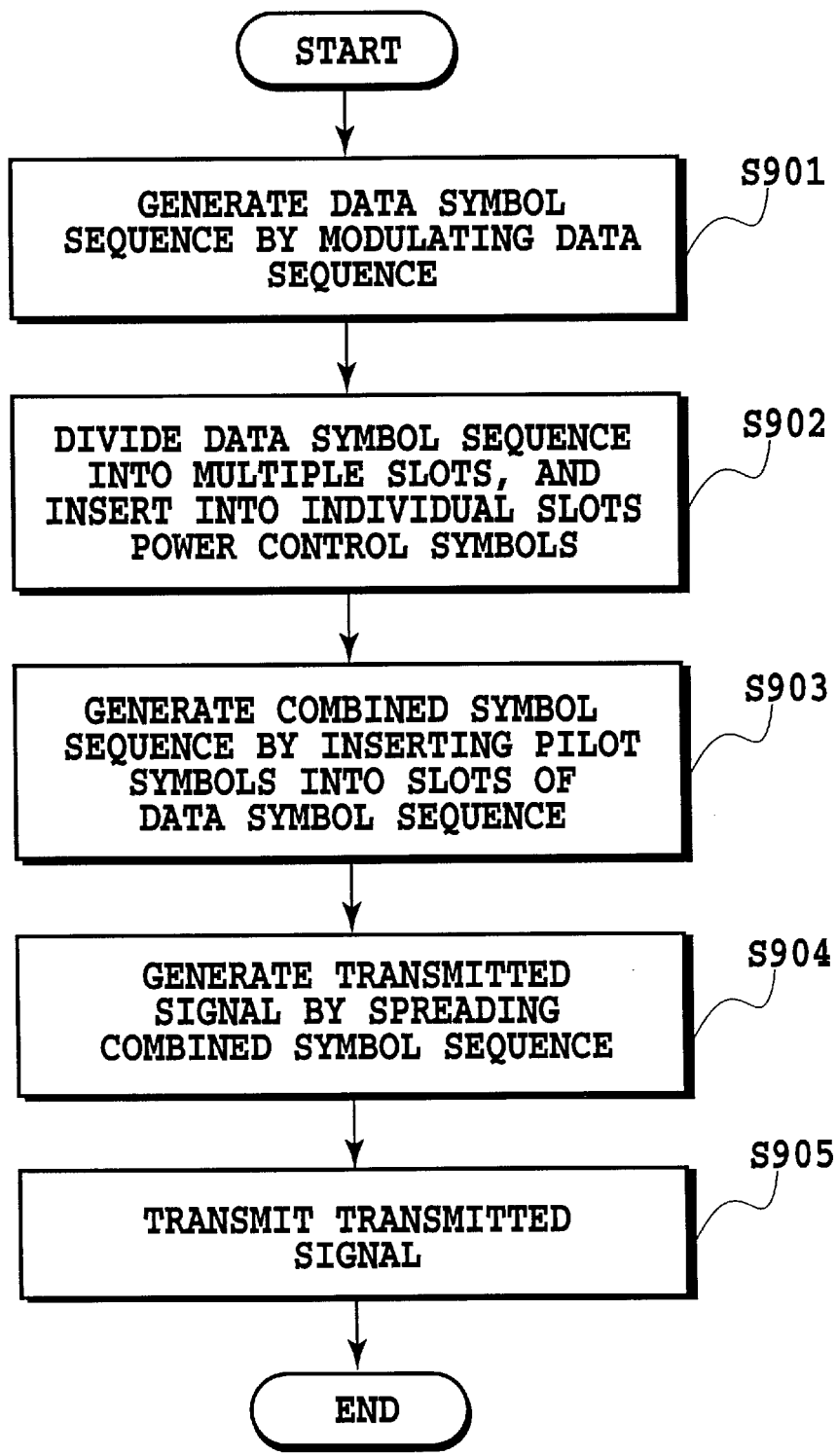
FIG. 9 is a flowchart illustrating a transmitting processing by the transmitting processor of the CDMA transceiver of the third embodiment in accordance with the present invention.

FIG. 9 is a flowchart illustrating a transmitting processing by the transmitting processor of the CDMA transceiver of the present embodiment. First, at step S901, the channel encoder 722 generates a data symbol sequence by modulating (encoding) a data sequence.

At step S902, the inserting section 724 divides the data symbol sequence into a plurality of slots, and inserts into the slots the power control symbols the party station uses to determine the power of data symbols and pilot symbols to be transmitted from the party station to the present station.

At step S903, the combiner 730 generates a combined symbol sequence by inserting the pilot symbols into the individual slots of the data symbol sequence. The power control symbols can be inserted after the pilot symbols are inserted.

Figure 10:
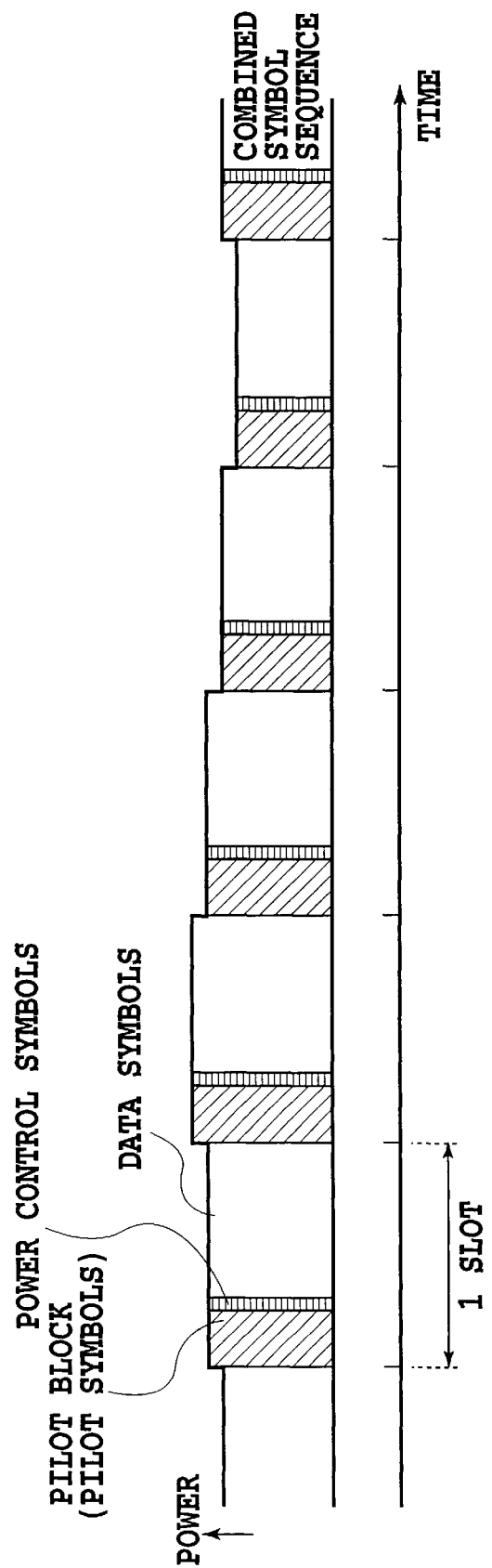
FIG. 10 is a diagram illustrating an example which inserts power control symbols into a combined symbol sequence.
Figure 11:
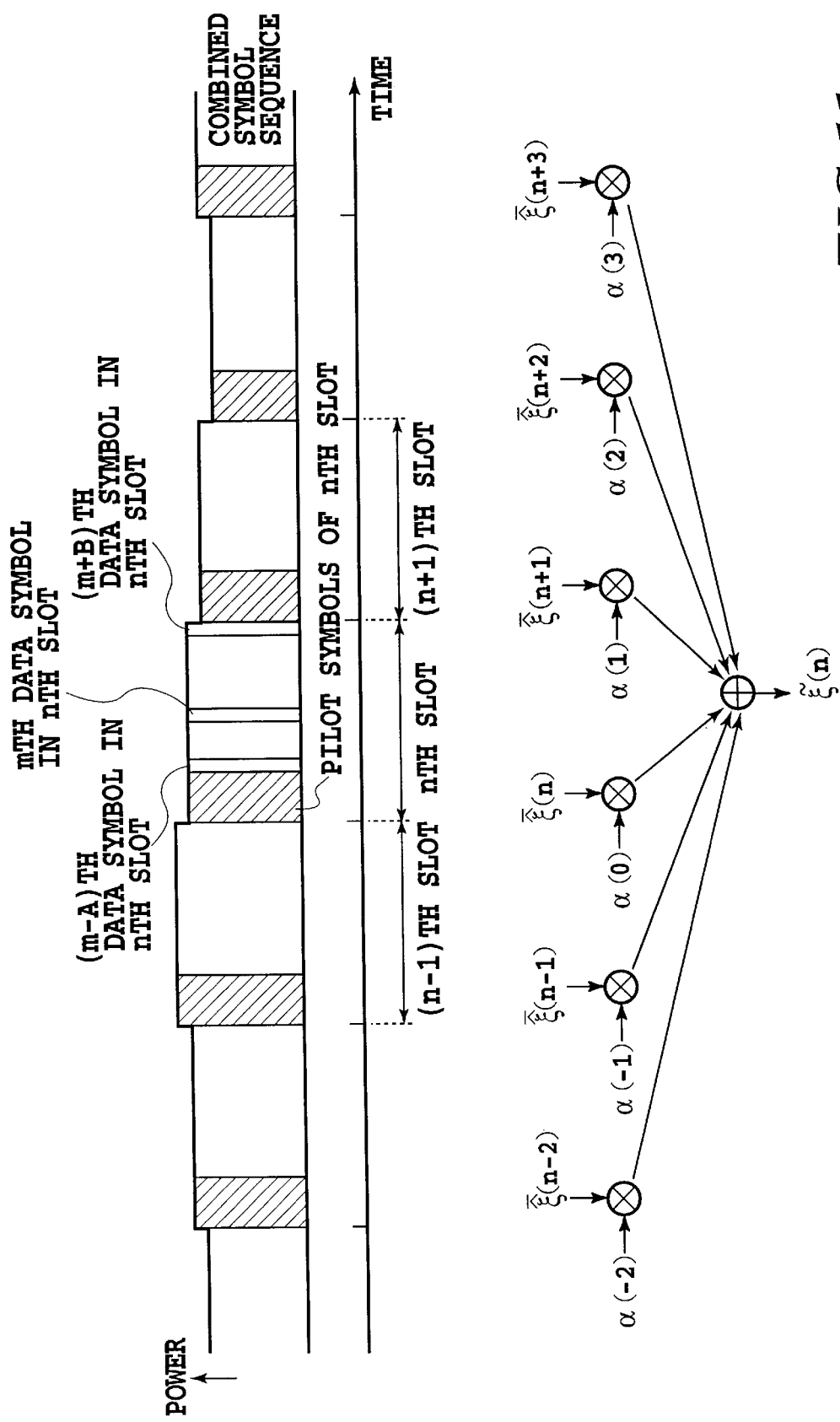
FIG. 11 is a diagram illustrating the principle of the channel estimation operation by a related art.
Figure 12:
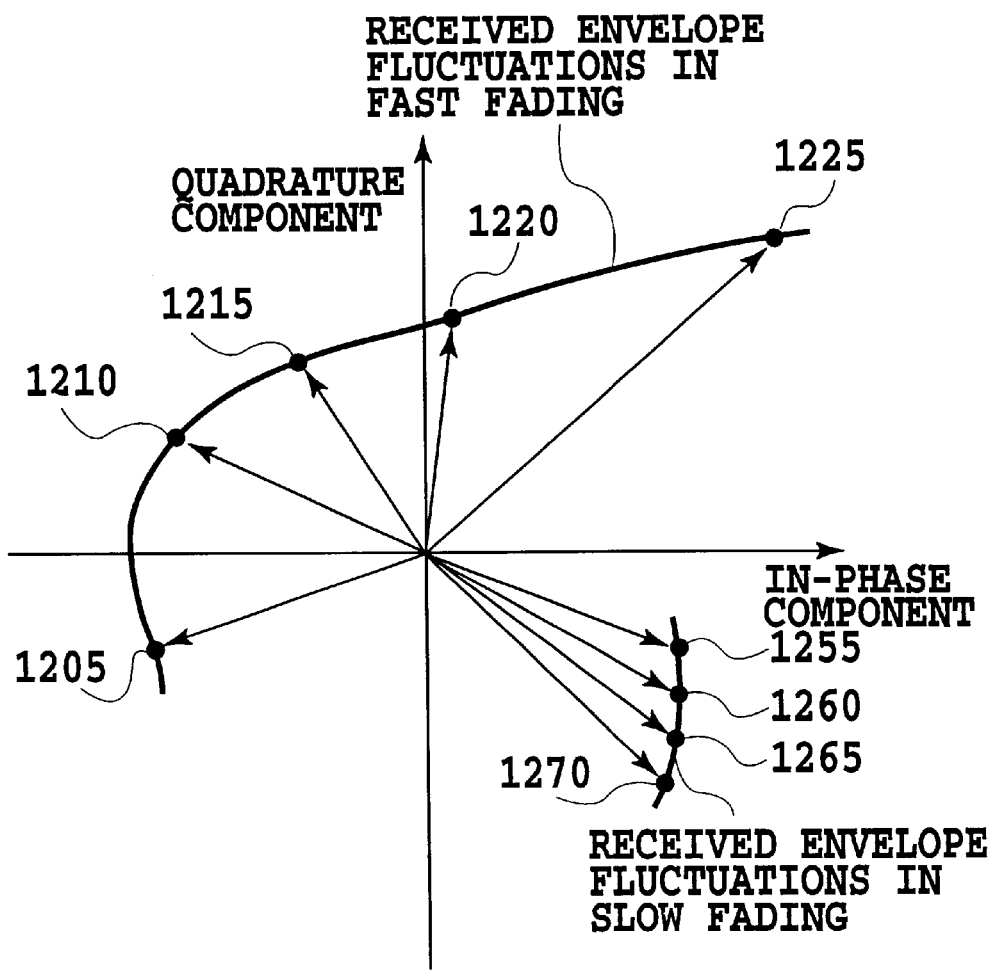
FIG. 12 is an example illustrating received envelope fluctuations due to fading.

FIG. 10 is a diagram illustrating an example of the combined symbol sequence into which the power control symbols are inserted.

Although the combined symbol sequence is generated which includes the data symbols, pilot symbols and power control symbol in the present embodiment, other types of combined symbol sequences can be generated.

Returning to FIG. 9, at step S904, the spreader 727 spreads the combined symbol sequence to generate a transmitted signal (spread combined symbol sequence).

At step S905, the transmitting section 710 transmits the transmitted signal with carrying out the power control slot by slot in accordance with a power control symbol sequence which is sent from the party station to the present station. Incidentally, the division of the symbols into a plurality of slots can be performed immediately before the transmission instead of carrying out at steps S902 and S903, Next, as shown in FIG. 8, the receiving processor 620 comprises a receiving section 810, a matched filter 825, a slot alignment detector 801, a pilot block generator 811, a channel estimate acquisition section 821, a pilot symbol eliminator 829, a data symbol sequence compensator 830, a RAKE combiner 832, a deinterleaver 834, a Viterbi decoder 836, a power control symbol generator 838 and a power control symbol sequence extracting section 840, Although these components such as the matched filter 825, slot alignment detector 801 and so forth are implemented in the form of software using a DSP (and a memory that stores programs) 820 in the present embodiment, they can be implemented with hardware. The structure and functions of the slot alignment detector 801, pilot block generator 811 and channel estimate acquisition section 821 are the same as those of their counterparts of the channel estimation unit 100 of the first embodiment in accordance with the present invention, and the structure and functions of the receiving section 810, matched filter 825 and so forth are the same as those of their counterparts of the CDMA receiver of the second embodiment. Accordingly, the receiving processor 620 carries out the same processing as those of the CDMA receiver of the second embodiment (FIG. 5) in accordance with the present invention.

The power control symbol generator 838 measures the SNIR from the pilot symbols extracted or the pilot blocks generated by the pilot block generator 811, and generates the power control symbols in response to the measured values. As a measuring method of the SNIR, there is a method of measuring it by obtaining the average and variance of the received signal. The SNIR measurement can also be achieved using a data symbol sequence fed back after decision. The power control symbols generated here are supplied to the inserting section 724 of the transmitting processor 610, which inserts them into the data symbol sequence to be transmitted when transmitting the next signal to the party station. Receiving the symbols, the party station uses them when transmitting a signal to the present station.

The power control symbol sequence extracting section 840 extracts from the data symbol sequence the power control symbol sequence, and supplies it to the transmitting section 710 of the transmitting processor 610 to be used when transmitting the next signal to the party station.

The transmission of the power control symbol sequence can be unidirectional rather than bidirectional. For example, the power control symbol sequence can be transmitted only from a base station to a mobile station to control the (transmission) power of only a reverse channel (from the mobile station to the base station) in communications between the two stations.

Thus, the transceiver can achieve in its processing highly accurate channel estimation and compensation for the channel fluctuations in the data symbol sequence.

As described above, the present invention can achieve, when performing the channel estimation of the data symbols, the highly accurate channel estimation by obtaining highly accurate channel estimates by calculating the sum of the pilot symbols which are appropriately weighted in the plurality of slots before and after the slot, to which the data symbol to be subjected to the channel estimation belongs, by using appropriate weighting factors for individual data symbols in each slot.

The highly accurate channel estimation together with the compensation for the channel fluctuations in the data symbols on the basis of the channel estimation makes it possible to decide the absolute phases of individual data symbols by using the absolute coherent detection, and to reduce the SNIR needed for achieving the desired receiving quality (receiving error rate). As a result, the transmission power can be reduced, and the capacity of the system in terms of the number of subscribers can be increased.

What is claimed is:

1. A channel estimation unit for obtaining channel estimates of data symbols from pilot symbols in a combined symbol sequence which has a plurality of slots and includes the data symbols and the pilot symbols, said channel estimation unit comprising:

means for locating the pilot symbols in the combined symbol sequence;

means for generating pilot blocks by extracting the pilot symbols from two or more slots in the combined symbol sequence in accordance with a located result; and means for obtaining the channel estimates of the data symbols by calculating a weighted sum of averages of the pilot symbols in the individual pilot blocks, wherein a magnitude of weighting differs between at least two data symbols in each slot, and when obtaining the channel estimates of the data symbols in an nth slot in the combined symbol sequence, where n is an integer, the pilot blocks are generated from (n−K+1)th slot to (n+K)th slot in the combined symbol sequence, where K is a natural number.

2. A channel estimation method of obtaining channel estimates of data symbols from pilot symbols in a combined symbol sequence which has a plurality of slots and includes thee data symbols and tile pilot symbols, said channel estimation method comprising the steps of:

locating the pilot symbols in the combined symbol sequence;

generating Pilot blocks by extracting the pilot symbols from two or more slots in the combined symbol sequence in accordance with a located result; and obtaining the channel estimates of the data symbols by calculating a weighted sum of averages of the pilot symbols in the individual pilot blocks, wherein a magnitude of weighting differs between at least two data symbols in each slot, and when obtaining the channel estimates of the data symbols in an nth slot in the combined symbol sequence, where n is an integers, the pilot blocks are generated from (n−K+1) th slot to (n+K)th slot in the combined symbol sequence, where K is a natural number.

3. A channel estimation unit for obtaining channel estimates of data symbols from pilot symbols in a combined symbol sequence which has a plurality of slots and includes the data symbols and the pilot symbols, said channel estimation unit comprising:

means for locating the pilot symbols in the combined symbol sequence; means for generating pilot blocks by extracting the pilot symbols from two or more slots in the combined symbol sequence in accordance with a located result;

means for obtaining the channel estimates of the data symbols by calculating a weighted sum of averages of the pilot symbols in the individual pilot blocks, wherein a magnitude of weighting differs between at least two data symbols in each slot and the power of the data symbols and pilot symbols is controlled on a slot by slot basis.

4. A CDMA receiver which receives a combined symbol sequence that is spread, has a plurality of slots, and includes data symbols and pilot symbols, and which generates a data sequence, said CDMA receiver comprising:

means for receiving the spread combined symbol sequence;

mean for generating a combined symbol sequence by despreading the spread combined symbol sequence;

means for locating the pilot symbols in the combined symbol sequence;

means for generating pilot blocks by extracting the pilot symbols from two or more slots in the combined symbol sequence in accordance with a located result;

means for obtaining channel estimates of the data symbols by calculating a weighted sum of averages of the pilot symbols in the individual pilot blocks;

means for obtaining a data symbol sequence by eliminating the pilot symbols from the combined symbol sequence in accordance with the located result;

means for compensating for channel fluctuations in the data symbol sequence by using the channel estimates of the data symbols; and means for generating the data sequence by demodulating the data symbol sequence compensated for, wherein a magnitude of weighlting differs between at least two data symbols in each slot.

5. A CDMA transceiver including a transmitting processor and a receiving processor, said transmitting processor comprising:

means for generating a data symbol sequence by modulating a data sequence;

means for generating a combined symbol sequence by inserting pilot symbols into the data symbol sequence;

means for generating a spread combined symbol sequence by spreading the combined symbol sequence; and means for transmitting the spread combined symbol sequence, wherein the spread combined symbol sequence to be transmitted has a plurality of slots, and said receiving processor comprising:

means for receiving the spread combined symbol sequence;

means for generating the combined symbol sequence by de spreading the spread combined symbol sequence;

means for locating the pilot symbols in the combined symbol sequence;

means for generating pilot blocks by extracting the pilot symbols from two or more slots in the combined symbol sequence in accordance with a located result;

means for obtaining channel estimates of the data symbols by calculating a weighted sum of averages of the pilot symbols in the individual pilot blocks;

means for obtaining a data symbol sequence by eliminating the pilot symbols from the combined symbol sequence in accordance with the located result;

means for compensating for channel fluctuations in the
data symbol sequence by using the channel estimates
of the data symbols; and means for generating the data sequence by demodulating the data symbol sequence compensated for, wherein a magnitude of weighting differs between at least two data symbols in each slot.

6. The CDMA transceiver as claimed in claim 5, wherein said transmitting processor further comprises means for inserting into the data symbol sequence a power control symbol sequence for controlling power of the data symbols and pilot symbols.

7. The CDMA transceiver as claimed in claim 6, wherein said receiving processor further comprises means for measuring from the pilot symbols a signal-to-noise and interference power ratio, and for generating the power control symbol sequence from the signal-to-noise and interference power ratio.

8. The CDMA transceiver as claimed in claim 5, wherein said receiving processor further comprises means for extracting, from the data symbol sequence compensated for, the power control symbol sequence for controlling power of the data symbols and pilot symbols, and said means for transmitting the spread combined symbol sequence transmits the spread combined symbol sequence in accordance with the power control symbol sequence.

9. The equipment as claimed in any one of claims 1, 4 and 5, wherein the power of the data symbols and pilot symbols is controlled on a slot by slot basis.

10. The equipment as claimed in any one of claims 1 and 3–5, wherein the number of data symbols included in each slot of the combined symbol sequence is the same, and the number of pilot symbols included in each slot of the combined symbol sequence is the same.

11. The equipment as claimed in any one of claims 1 and 3–5, wherein the pilot blocks each consist of all the pilot symbols in each slot.

12. The equipment as claimed in any one of claims 3–5, wherein when obtaining the channel estimates of the data symbols in an nth slot in the combined symbol sequence, where n is an integer, the pilot blocks are generated from (n−K+1)th slot to (n+K)th slot in the combined symbol sequence, where K is a natural number.

13. The equipment as claimed in any one of clam 1 and 3–5, wherein the pilot blocks closer to the data symbol with which the channel estimates is to be obtained have greater weight.

14. A channel estimation method of obtaining channel estimates of data symbols from pilot symbols in a combined symbol sequence which has a plurality of slots and includes the data symbols and the pilot symbols, said channel estimation method comprising the steps of:

locating the pilot symbols in the combined symbol sequence;

generating pilot blocks by extracting the pilot symbols from two or more slots in the combined symbol sequence in accordance with a located result; and obtaining the channel estimates of the data symbols by calculating a weighted sum of averages of the pilot symbols in the individual pilot blocks, wherein a magnitude of weighting differs between at least two data symbols in each slot, and the power of the data symbols and pilot symbols is controlled on a slot by slot basis.

15. A CDMA receiving method of generating a data sequence by receiving a combined symbol sequence that has a plurality of slots, includes data symbols and pilot symbols, and is spread, said CDMA receiving method comprising the steps of:

receiving the spread combined symbol sequence;

generating the combined symbol sequence by despreading the spread combined symbol sequence;

locating the pilot symbols in the combined symbol sequence;

generating pilot blocks by extracting the pilot symbols from two or more slots in the combined symbol sequence in accordance with a located result;

obtaining channel estimates of the data symbols by calculating a weighted sum of averages of the pilot symbols in the individual pilot blocks;

obtaining a data symbol sequence by eliminating the pilot symbols from the combined symbol sequence in accordance with tie located result;

compensating for channel fluctuations in the data symbol sequence by using the channel estimates of the data symbols; and generating the data sequence by demodulating the data symbol sequence compensated for, wherein a magnitude of weighting differs between at least two data symbols in each slot.

16. A CDMA transmitting and receiving method comprising the steps of:

on a transmitting side, generating a data symbol sequence by modulating a data sequence;

generating a combined symbol sequence by inserting pilot symbols into the data symbol sequence;

generating a spread combined symbol sequence by spreading the combined symbol sequence; and transmitting the spread combined symbol sequence, wherein the spread combined symbol sequence to be transmitted has a plurality of slots, and on a receiving side, receiving the spread combined symbol sequence;

generating the combined symbol sequence by despreading the spread combined symbol sequence;

locating the pilot symbols in the combined symbol sequence;

generating pilot blocks by extracting the pilot symbols from two or more slots in the combined symbol sequence in accordance with a located result;

obtaining channel estimates of the data symbols by calculating a weighted sum of averages of the pilot symbols in the individual pilot blocks;

obtaining a data symbol sequence by eliminating the pilot symbols from the combined symbol sequence in accordance with the located result;

compensating for channel fluctuations in the data symbol sequence by using the channel estimates of the data symbols; and generating the data sequence by demodulating the data symbol sequence compensated for, wherein a magnitude of weighting differs between at least two data symbols in each slot.

* * * * *

UNITED STATES PATENT AND TRADEMARK OFFICE
CERTIFICATE OF CORRECTION

PATENT NO. : 6,757,272 B1
DATED : June 29, 2004
INVENTOR(S) : Sadayuki Abeta et al.

It is certified that error appears in the above-identified patent and that said Letters Patent is hereby corrected as shown below:

Column 1,
Lines 22 and 42, change "Raleigh" to -- Rayleigh --

Column 2,
Line 2, change "Raleigh" to -- Rayleigh --

Line 13, after "estimates" change "$\xi$" to -- $\tilde{\xi}$ --

Line 31, after "slots" change "are" to -- to be --

Line 31, after "estimates" change "$\hat{\xi}$" to -- $\tilde{\xi}$ --

Line 38, change "$\xi$" to -- $\tilde{\xi}$ --

Line 40, after "assign" change "a" to -- the --
Line 42, after "and" remove "."
Line 42, before "best" change "Hence" to -- hence --

Column 3,
Line 12, change "Raleigh" to -- Rayleigh --
Lines 17 and 18, change "according to the invention as claimed in claim 1," to -- in the first aspect of the present invention, there is provided --
Line 34, after "each" change "slot." to -- slot, and --
Between lines 34 and 35, insert a new sub-paragraph with the text -- the power of the data symbols and pilot symbols is controlled on a slot by slot basis. --
Line 35, change "According to the invention as claimed in claim 2," to -- In the second aspect of the present invention there is provided --
Line 39, change "comprises:" to -- comprising: --
Line 63, change "According to the invention as claimed in claim 3," to -- In the third aspect of the present invention, there is provided --
Line 65, change "comprises:" to -- comprising: --

Column 4,
Line 29, change "modulating" to -- demodulating --
Lines 33 and 34, change "According to the invention as claimed in claim 4, in the CDMA transceiver as claimed in claim 3, he" to -- Here the --
Lines 35, 40 and 46, change "further comprises" to -- may further comprise --
Lines 38 and 39, change "According to the invention as claimed in claim 5, in the CDMA transceiver as claimed in claim 4," to -- Here --

UNITED STATES PATENT AND TRADEMARK OFFICE
CERTIFICATE OF CORRECTION

PATENT NO. : 6,757,272 B1
DATED : June 29, 2004
INVENTOR(S) : Sadayuki Abeta et al.

It is certified that error appears in the above-identified patent and that said Letters Patent is hereby corrected as shown below:

Column 4,
Lines 44 and 45, change "According to the invention as claimed in claim 6, in the CDMA transceiver as claimed in any one of claims 3-5," to -- Here --
Lines 50 and 51, remove "transmits the spread combined symbol sequence"
Line 51, before "power" change "he" to -- the --
Lines 53 and 54, change "According to the invention as claimed in claim 7, in the equipment as claimed in any one of claims 1-6," to -- Here --
Line 55, before "controlled" change "is" to -- may be --
Lines 57 and 58, change "According to the invention as claimed in claim 8, in the equipment as claimed in any one of claims 1-6," to -- Here --
Lines 60 and 62, after "sequence" change "is" to -- may be --
Lines 63 and 64, change "According to the invention as claimed in claim 9, in the equipment as claimed in any one of claims 1-8," to -- Here --
Line 65, before "consist" insert -- may --
Lines 66 and 67, change "According to the invention as claimed in claim 10, in the equipment as claimed in any one of claims 1-9," to -- Here --

Column 5,
Lines 6 and 7, change "According to the invention as claimed in claim 11, in the equipment as claimed in any one of claims 1-10," to -- Here --
Line 10, change "According to the invention as claimed in claim 12," to -- In the fourth aspect of the present invention, there is provided --
Line 13, after "symbols," change "comprises" to -- comprising --
Line 21, before "wherein" begin a new sub-paragraph
Line 23, after "each" change "slot." to -- slot, and --
Between lines 23 and 24, insert a new sub-paragraph with the text -- the power of the data symbols and pilot symbols is controlled on a slot by slot basis. --
Line 24, change "According to the invention as claimed in claim 13," to -- In the fifth aspect of the present invention, there is provided --
Line 28, after "spread," change "comprises" to -- comprising --
Line 51, change "According to the invention as claimed in claim 14," to -- In the sixth aspect of the present invention, there is provided --
Line 52, after "method" change "comprises" to -- comprising --

UNITED STATES PATENT AND TRADEMARK OFFICE
CERTIFICATE OF CORRECTION

PATENT NO. : 6,757,272 B1
DATED : June 29, 2004
INVENTOR(S) : Sadayuki Abeta et al.

It is certified that error appears in the above-identified patent and that said Letters Patent is hereby corrected as shown below:

Column 6,
Line 19, after the last paragraph of the section entitled "DISCLOSURE OF THE INVENTION" and before the section entitled "BRIEF DESCRIPTION OF DRAWINGS" insert the following paragraphs:

-- In the seventh aspect of the present invention, there is provided a channel estimation unit for obtaining channel estimates of data symbols from pilot symbols in a combined symbol sequence which has a plurality of slots and includes the data symbols and the pilot symbols, said channel estimation unit comprising:
means for locating the pilot symbols in the combined symbol sequence;
means for generating pilot blocks by extracting the pilot symbols from two or more slots in the combined symbol sequence in accordance with a located result; and
means for obtaining the channel estimates of the data symbols by calculating a weighted sum of averages of the pilot symbols in the individual pilot blocks,
wherein a magnitude of weighting differs between at least two data symbols in each slot, and when obtaining the channel estimates of the data symbols in an nth slot in the combined symbol sequence, where n is an integer, the pilot blocks are generated from (n-K+1)th slot to (n+K)th slot in the combined symbol sequence, where K is a natural number.
In the eighth aspect of the present invention, there is provided a channel estimation method of obtaining channel estimates of data symbols from pilot symbols in a combined symbol sequence which has a plurality of slots and includes the data symbols and the pilot symbols, said channel estimation method comprising the steps of:
locating the pilot symbols in the combined symbol sequence;
generating pilot blocks by extracting the pilot symbols from two or more slots in the combined symbol sequence in accordance with a located result; and
obtaining the channel estimates of the data symbols by calculating a weighted sum of averages of the pilot symbols in the individual pilot blocks.
wherein a magnitude of weighting differs between at least two data symbols in each slot, and when obtaining the channel estimates of the data symbols in an nth slot in the combined symbol sequence, where n is an integer, the pilot blocks are generated from (n-K+1)th slot to (n+K)th slot in the combined symbol sequence, where K is a natural number. --

Column 8,
Lines 1, 4 and 7 change "$\xi$" to -- $\tilde{\xi}$ --

Line 2, before "obtained" change "is" to -- are --

Line 10, change "$\tilde{\xi}(m,n) = \sum_{i=-k+1}^{K} \alpha(m,i) \cdot \tilde{\xi}(n+i)$" to -- $\tilde{\xi}(m,n) = \sum_{i=-k+1}^{K} \alpha(m,i) \cdot \tilde{\xi}(n+i)$ --

Line 56, after "receiving" change "processing" to -- process --

UNITED STATES PATENT AND TRADEMARK OFFICE
CERTIFICATE OF CORRECTION

PATENT NO. : 6,757,272 B1
DATED : June 29, 2004
INVENTOR(S) : Sadayuki Abeta et al.

It is certified that error appears in the above-identified patent and that said Letters Patent is hereby corrected as shown below:

Column 9,
Lines 10 and 14, change "$\xi$" to -- $\tilde{\xi}$ --

Line 18, after "carries" insert -- out the in-phase combining of the compensated data --
Line 40, after "spreader" change "727," to -- 727. --
Line 46, after "transmitting" change "processing" to -- process --

Column 10,
Line 18, after "section" change "840," to -- 840. --

Column 11,
Line 41, before "data" change "thee" to -- the --
Line 41, before "pilot" change "tile" to -- the --
Line 45, after "generating" change "Pilot" to -- pilot --
Line 54, change "integers" to -- integer --

Column 12,
Line 15, before "for" change "mean" to -- means --
Line 34, before "differs" change "weighlting" to -- weighting --
Line 54, after "by" change "de spreading" to -- de-spreading --

Column 13,
Line 44, change "clam" to -- claim --

Column 14,
Line 21, before "located" change "tie" to -- the --
Line 38, after "and" begin a new sub-paragraph.

Signed and Sealed this

Twenty-sixth Day of April, 2005

JON W. DUDAS
*Director of the United States Patent and Trademark Office*